UNITED STATES PATENT OFFICE.

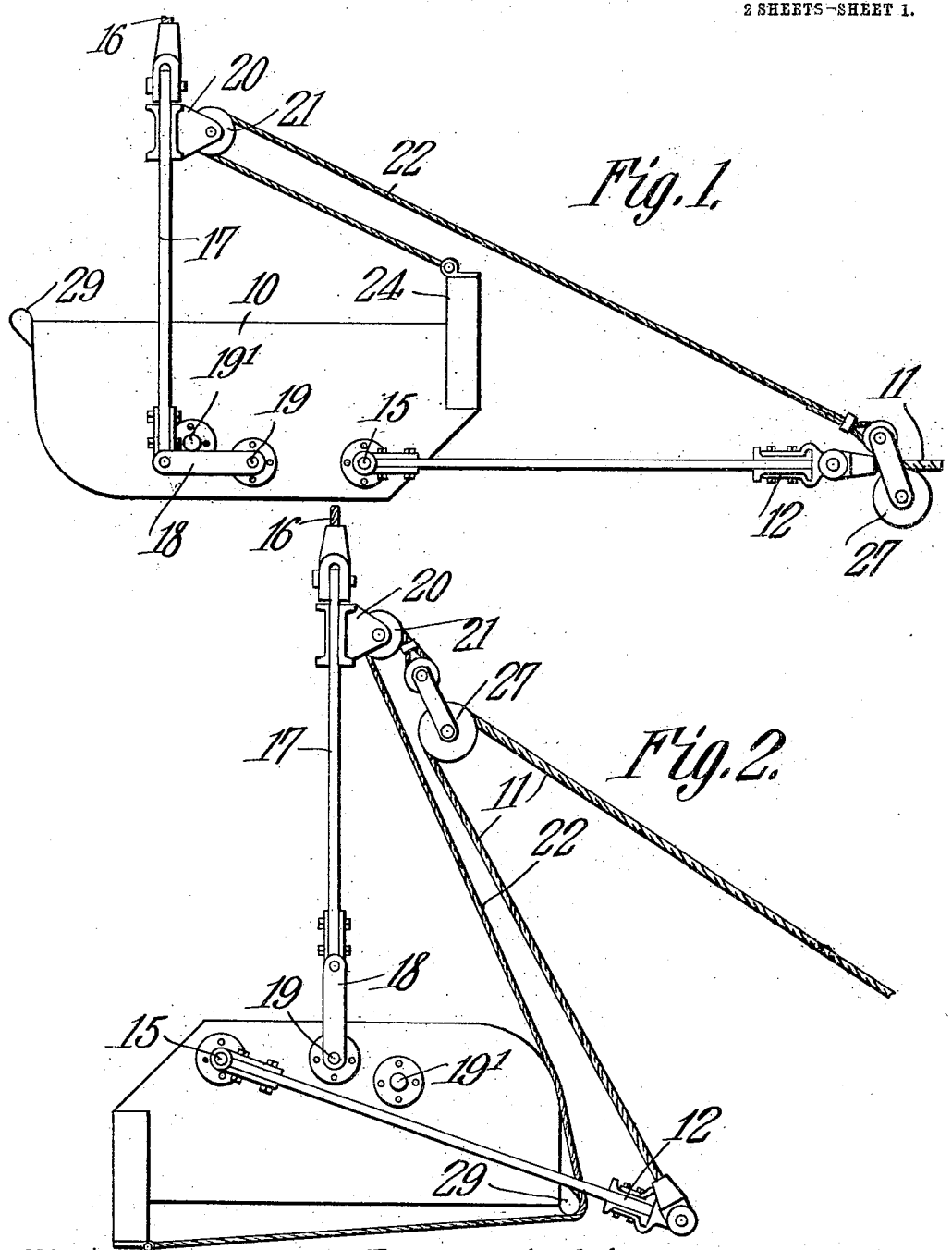

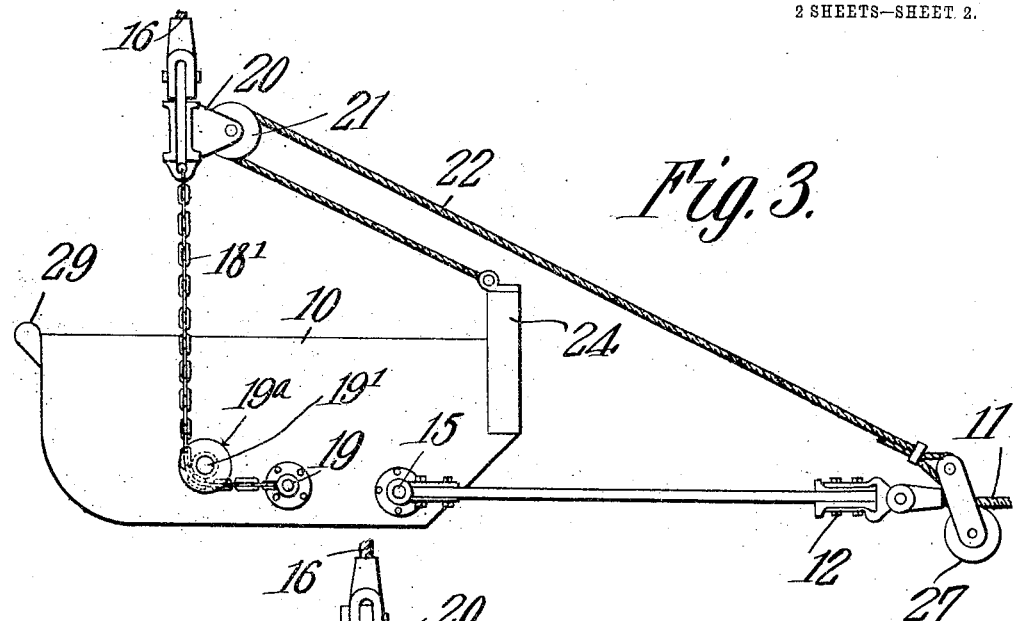
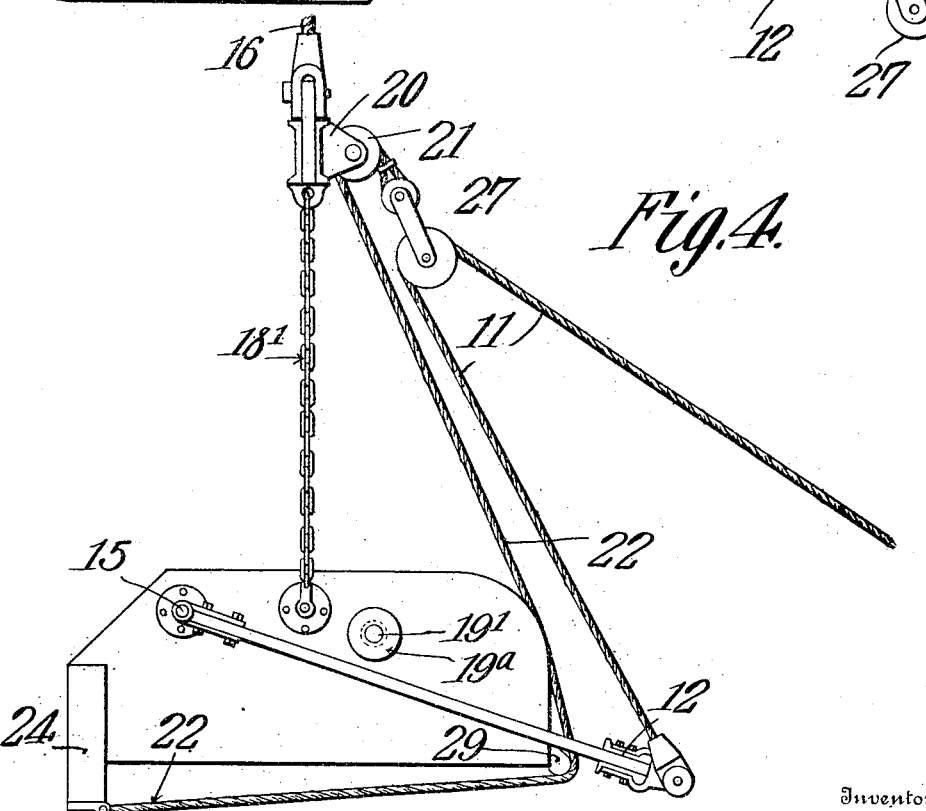

JAMES G. FAIRBANKS, OF MARION, OHIO.

EXCAVATING-SCRAPER.

No. 880,643.  Specification of Letters Patent.  Patented March 3, 1908.

Application filed September 20, 1907. Serial No. 393,833.

*To all whom it may concern:*

Be it known that I, JAMES G. FAIRBANKS, a citizen of the United States, residing at Marion, in the county of Marion and State of Ohio, have invented a new and useful Excavating-Scraper, of which the following is a specification.

This invention relates to drag line excavating scrapers or shovels, and has for its principal object to provide a novel form of scraper and scraper mounting which may be so turned to dumping position as to insure the full discharge of the load.

A further object of the invention is to provide a scraper and scraper mounting which, when moved to dumping position, will be completely inverted.

A still further object of the invention is to provide a scraper or shovel in which the load or weight is imposed on the support at two different points during the filling and dumping operations.

A still further object of the invention is to provide an improved mounting that will insure the positive return of the scraper or shovel to filling position after the dumping operation.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a side elevation of an excavating scraper constructed and arranged in accordance with the invention, the parts being shown in operating or load receiving position. Fig. 2 is a similar view showing the scraper in dumping position. Figs. 3 and 4 are views corresponding to Figs. 1 and 2, respectively, illustrating a modification of the invention.

Similar numerals of reference are employed to indicate corresponding parts throughout the several figures of the drawings.

The scraper 10 is of that general type designed to be hauled along the ground and become filled with dirt or other material during such operation, and for this purpose the hauling rope 11 is used, the end of the rope being connected to a bail 12, the opposite ends of which are pivoted to pins 15 projecting from the opposite sides of the scraper at points near the lower forward edge thereof.

The scraper is supported by a rope 16 to the lower end of which is secured a bail 17 that straddles the scraper, the lower ends of said bail being pivotally connected to links 18, which links are hung on trunnions 19 that project from the opposite side walls of the scraper at a point below the center of gravity thereof, and approximately in the vertical plane of such center of gravity.

Projecting from the opposite sides of the scraper at a point slightly above and to the rear of the trunnions 19 are two pins 19' which when the scraper is in excavating or loading position rest on the links 18, so that the weight is imposed on these links at a point to the rear of the vertical plane of the center of gravity during the loading operation.

Secured to the upper portion of the bail 17 is a bracket 20 in which is journaled a sheave 21 and around this sheave passes a rope 22, one end of which is secured to a strap 24 that is fastened to the front of the scraper, while the opposite end of said rope carries a sheave 27, over which the hauling rope 11 passes. During the dumping operation this rope will engage with the upper rear edge of the scraper and for this purpose a rounded rib 29 is provided at said edge in order to prevent chafing of the rope.

During the excavating or loading operation, the parts will assume the position shown in Fig. 1, the strain on the rope 22 being just sufficient to keep it taut, while the links 18 will be in a horizontal position and the pins 19' will rest on such links. When the scraper is filled, the rope 11 is slackened and as the weight of the scraper is greatest at the forward end when the parts are in the position shown in Fig. 1, the forward end will move down and the scraper will swing through an arc of 180° the scraper being completely inverted and thus insuring the dumping of the load, and the scraper will remain in this position owing to the fact that the trunnions 19 are practically in the vertical plane of the center of gravity of the scraper, and are then in vertical alinement with the bail 17. As the scraper moves to the dumping position, the rope 22 will be carried around over the rounded flange or shoulder 29 and the sheave 22 will be hoisted up carrying with it the slackened hauling rope 11. When the scraper is to be restored to loading position the rope 11 is held taut, and the first result of this operation will be to lift the bail 12, the latter coming into contact with the pins 19' and turning the scraper with the trunnions as a center. As the movement continues, strain will then be exerted on the sheave 27 and the latter will be pulled down thus pulling upward on the rope 22 and turning the scraper back to the loading position with the pins 19' resting on the links 18.

In the construction shown in Figs. 3 and 4 chains 18' are employed in place of the links 18, and sheaves 19ᵃ are used in place of the projecting lugs 19'. The operation is, however, the same as that previously described.

I claim:—

1. The combination in a drag line excavator, of a scraper, a hauling member connected to the lower front portion of the same, and a support pivoted to the scraper at a point below and in the vertical plane of the center of gravity thereof, whereby the scraper is free to swing from a filling position to full inverted position for dumping.

2. The combination in a drag line excavator, of a scraper, a scraper support pivoted thereto at a point below the center of gravity of the scraper, and approximately in the vertical plane of such center of gravity, and a hauling member connected to said scraper.

3. In combination, a scraper, and a scraper carrier on which the scraper is free to turn to full inverted dumping position, a hauling member, and means associated therewith for restoring the scraper to loading or excavating position.

4. In combination, a scraper, a scraper carrier pivoted thereto at a point below the center of gravity of the scraper, and means on the scraper for engaging the support and imposing the load on the carrier at a point to the rear of the vertical plane of the center of gravity during the loading or excavating operation.

5. In combination, a scraper, a carrier pivotally connected thereto, the carrier being formed of pivotally connected sections, and the point of connection between the carrier and the scraper being below the center of gravity of the latter, and projections extending from the scraper and engaging portions of the carrier to thereby impose the load on the carrier at a point to the rear of the vertical plane of the center of gravity of the scraper during the loading and excavating operation.

6. In combination, a scraper, a supporting bail, links connecting the bail to the scraper at a point below the center of gravity of the latter, and pins extending from the scraper at a point to the rear of the vertical plane of the center of gravity and arranged to engage said links and maintain the same in approximately horizontal position during the loading operation.

7. In combination, a scraper, a carrier pivoted to the scraper at a point below and in the vertical plane of the center of gravity of the latter, a hauling rope connected to the lower forward portion of the scraper, and a flexible connection operable from the hauling rope for returning the scraper from dumping to loading position.

8. In a scraper of the class described, a carrying means pivoted to the scraper at a point below its center of gravity, the carrier being formed of pivotally connected sections, a hauling bail pivoted to the lower forward portion of the scraper, a hauling rope connected to the bail, pins extending from the opposite sides of the scraper and resting on sections of the carrier during the loading operation, and a flexible connecting means between the forward portion of the scraper and the hauling rope, whereby the scraper may be turned to load receiving position when tensional strain is exerted on said hauling rope.

9. In combination, a scraper, a scraper carrier formed of pivotally connected sections, a pair of pins projecting from the scraper and arranged to rest on sections of the carrier during the loading operation, a hauling bail pivoted to the lower forward portion of the scraper and arranged to engage the pins during the preliminary return movement of the scraper to load receiving position, a hauling rope connected to the bail, and a flexible connection extending from the forward portion of the scraper to said hauling rope.

10. In combination, a scraper, a carrier to which the scraper is pivoted at a point below and in the vertical plane of the center of gravity, the scraper being free to move to full inverted position for dumping, a hauling rope, and a restoring rope connected to the forward portion of the scraper and operable from the hauling rope for returning the scraper to load receiving position.

11. In combination, a scraper, a carrier to which the scraper is pivoted at a point below and in the vertical plane of the center of gravity, the scraper being free to move to full inverted position for dumping, a hauling rope connected to the scraper, and a restoring rope connected at one end to the scraper and provided at the opposite end with a sheave or guide with which the hauling rope engages.

12. In combination, a scraper, a carrying bail therefor, a sheave supported by the carrying bail, a hauling rope, a strap extending across the upper front portion of the scraper, the rear upper edge of the scraper having a rounded rib, a restoring rope connected at one end to the strap and arranged to bear against the rib when the scraper is inverted, said rope passing around the sheave, and a second sheave carried by the restoring rope and around which the hauling rope extends.

In testimony that I claim the foregoing as my own, I have hereto affixed my signature in the presence of two witnesses.

JAMES G. FAIRBANKS.

Witnesses:
R. C. McCollum,
C. W. Fairbanks.